United States Patent
Tomita et al.

[11] Patent Number: 5,835,467
[45] Date of Patent: Nov. 10, 1998

[54] APPARATUS FOR REPRODUCING RECORDED INFORMATION

[75] Inventors: Yoshimi Tomita; Hiroki Kuribayashi, both of Tsurugashima, Japan

[73] Assignee: Pioneer Electronic Corporation, Tokyo, Japan

[21] Appl. No.: 847,357

[22] Filed: Apr. 24, 1997

[30] Foreign Application Priority Data

May 30, 1996 [JP] Japan .................................... 8-136117

[51] Int. Cl.$^6$ ....................................................... G11B 7/00
[52] U.S. Cl. ........................ 369/59; 369/124; 369/44.34
[58] Field of Search .................... 369/59, 42, 48, 369/49, 50, 54, 58, 60, 32, 124, 44.27, 444.28, 44.34, 44.29, 44.35

[56] References Cited

U.S. PATENT DOCUMENTS 5,555,231  9/1996  Yamamoto ............................ 369/58 X
5,719,886  2/1998  Matsui et al. ......................... 369/32 X

*Primary Examiner*—Muhammad N. Edun
*Attorney, Agent, or Firm*—Sughrue, Mion, Zinn, Macpeak & Seas, PLLC

[57] ABSTRACT

A recorded information reproducing apparatus which can remove a crosstalk of a read signal read from a recording medium which was high density recorded without decreasing a recording capacity of a recording medium. The apparatus obtains a first read sample value series by reading and sampling recorded information from a track on the recording medium, obtains a second read sample value series by reading and sampling recorded information from neighboring tracks adjacent to the track, and obtains a crosstalk component by filtering processing the second read sample value series in a variable coefficient filter. A result obtained by subtracting the crosstalk component from the first read sample value series is obtained as a read sample value series. A coefficient of the variable coefficient filter is updated so that a zero-cross sample value extracted from the read sample value series is converged to zero.

5 Claims, 4 Drawing Sheets

READING DIRECTION

APPARATUS FOR REPRODUCING RECORDED INFORMATION

BACKGROUND OF THE INVENTION

1. Field of the Invention

The invention relates to an apparatus for reproducing recorded information from a recording medium.

2. Related Background Art

As a method for recording information data at a high density onto an optical disc as a recording medium, a method of reducing a pit length, narrowing a track pitch, or the like is considered. In the case where the track pitch is narrowed, however, when the information is read, it is influenced by a crosstalk from each adjacent track. When the crosstalk occurs, a read signal read from the optical disc doesn't have a desired waveform, so that a reproduction signal of a high reliability cannot be obtained from the read signal.

In a reproducing apparatus for reproducing recorded information from the optical disc, the crosstalk is removed by an adaptive signal process.

For example, in a recorded information reproducing apparatus disclosed in Japanese Patent Application Kokai No. 3-40225, a crosstalk is removed by using read signals read from three adjacent tracks by a pickup having three beams. First, by performing the adaptive signal process using a frequency variable filter to each of the read signals read from both of the adjacent tracks of the center track, a crosstalk replica of a polarity opposite to that of the crosstalk component which occurs when information of the center track is read is obtained. Each of the crosstalk replicas is added to the read signal read out from the center track, thereby removing the crosstalk. A filter coefficient of the frequency variable filter is updated so that an error between the addition result and a predetermined reference signal is converged to zero. That is, a preamble signal of the same signal pattern as that of the reference signal is previously recorded in a predetermined interval of the optical disc and the filter coefficient of the frequency variable filter is updated as mentioned above for a reading period of time of the preamble signal.

In the reproducing apparatus disclosed in the Japanese Patent Application Kokai No. 3-40225, in order to remove the crosstalk, the preamble signal has to be preliminarily recorded onto the optical disc, so that there is a problem such that a recording capacity for information data to be recorded onto the optical disc decreases.

OBJECT AND SUMMARY OF THE INVENTION

The present invention is made to solve the above problems and it is an object of the invention to provide a recorded information reproducing apparatus in which a crosstalk of a read signal read from a recording medium which was recorded at a high density is removed and a good reproduction signal can be obtained, without decreasing a recording capacity of the recording medium.

A recorded information reproducing apparatus according to the invention comprises: reading means for obtaining a first read signal by reading recorded information from a track on a recording medium and obtaining a second read signal by reading recorded information from neighboring tracks which are adjacent to the track; an A/D converter for respectively sampling the first read signal and the second read signal and converting the respective sampled signals into a first read sample value series and a second read sample value series; a variable coefficient filter for obtaining a crosstalk component by performing a filtering process to the second read sample value series; a subtracter for obtaining a result obtained by subtracting the crosstalk component from the first read sample value series as a read sample value series; zero-cross sample extracting means for extracting a zero-cross sample value from the read sample value series; filter coefficient operating means for updating a filter coefficient of the variable coefficient filter so that the zero-cross sample value is converged to zero; and discriminating means for discriminating a reproduction signal corresponding to the recorded information in accordance with the read sample value series.

DETAILED DESCRIPTION OF THE PREFERRED EMBODIMENT

Figure 1:
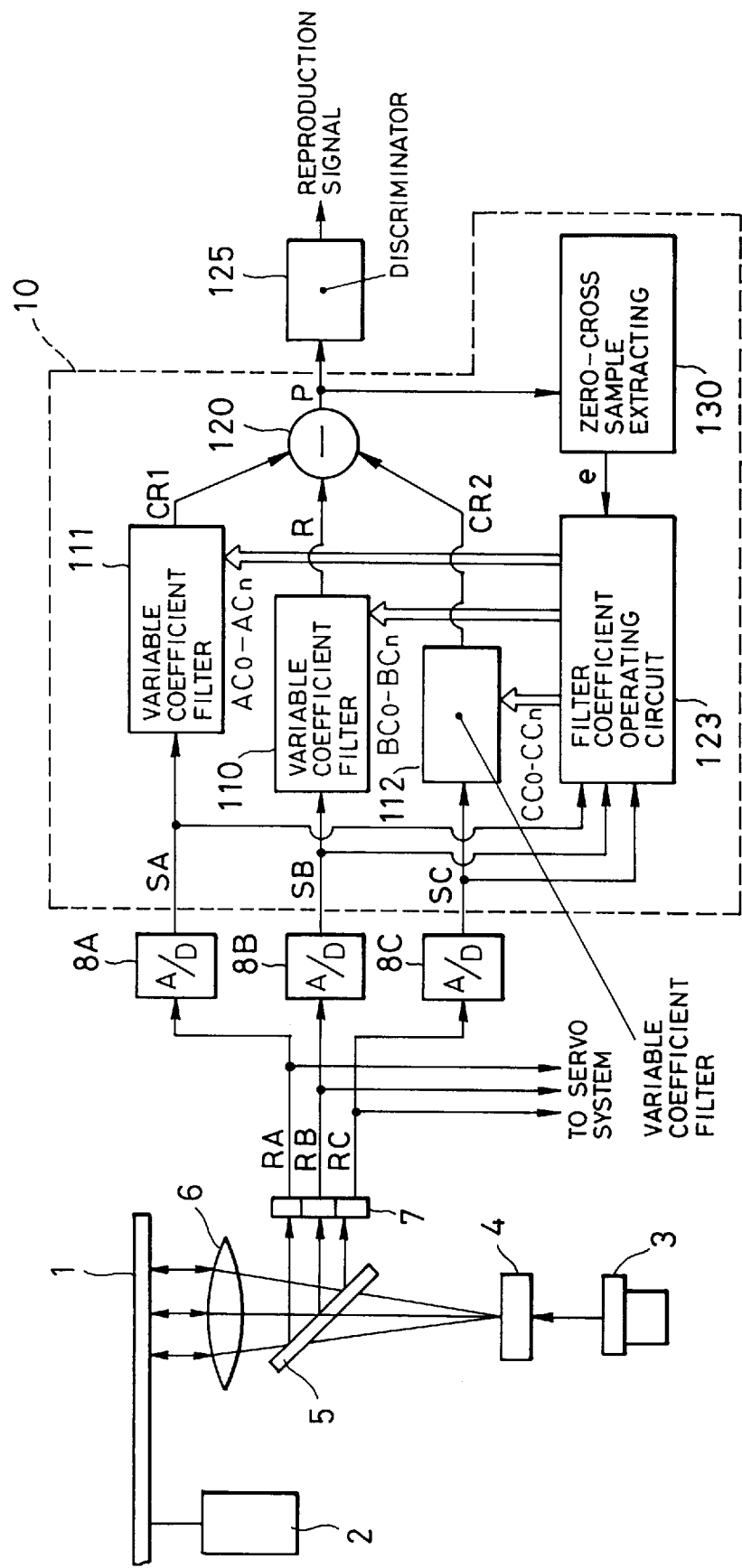
FIG. 1 is a diagram showing a construction of a recorded information reproducing apparatus according to the present invention.

FIG. 1 is a diagram showing a construction of a recording information reproducing apparatus according to the present invention.

In FIG. 1, a laser beam generated from a laser oscillator 3 is divided into three beams through a grating lens 4. The three beams are irradiated onto an optical disc 1 through a half mirror 5 and an objective lens 6 to read recorded information. A spindle motor 2 rotates the optical disc 1. The three information reading beams are respectively irradiated to three adjacent tracks on the disc 1.

Figure 2:
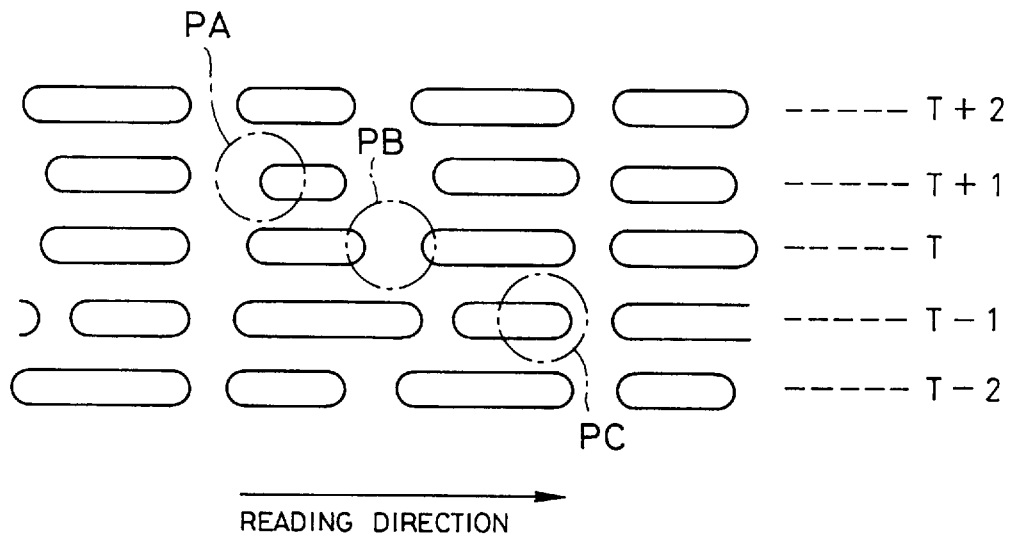
FIG. 2 is a diagram showing beam spots on tracks.

FIG. 2 is a diagram showing beam spots each of which is caused on a recording surface of the optical disc 1 by the three information reading beams.

As shown in FIG. 2, when a center beam spot PB is formed on a track T, a beam spot PA is formed on a track T+1 next to the track T. Further, a beam spot PC is formed on a track T−1 next to the track T on the opposite side of the track T+1. A light reflected from a disc surface portion of each of the beam spots PA, SB, and SC is irradiated onto a photodetector 7 through the objective lens 6 and half mirror 5. The photodetector 7 obtains an electric signal, as a read signal RA, obtained by photoelectrically converting the reflected light from a disc surface portion formed the beam spot PA. The photodetector 7 obtains an electric signal, as a read signal RB, obtained by photoelectrically converting the reflected light from a disc surface portion formed the beam spot PB. Further, the photodetector 7 obtains, as a read signal RC, obtained by photoelectrically converting the reflection light from a disc surface portion formed the beam spot PC. The read signals RA, RB, and RC are supplied to a servo system (not shown) to perform various servo processes such as tracking servo, focusing servo, spindle servo and are also supplied to A/D converters 8A to 8C.

The A/D converter 8A supplies a read sample value series SA obtained by sampling the read signal RA at every predetermined sampling clock to a crosstalk removing circuit 10. The A/D converter 8B supplies a read sample value series SB obtained by sampling the read signal RB at every predetermined sampling clock to the crosstalk removing circuit 10. The A/D converter 8C supplies a read sample value series SC obtained by sampling the read signal RC at every predetermined sampling clock to the crosstalk removing circuit 10.

A frequency of the predetermined sampling clock is set to a value that is integer times as high as a channel frequency of an information signal recorded on the optical disc 1.

The crosstalk removing circuit 10 performs an adaptive signal process using, for example, an LMS adaptive algorithm to the read sample value series SA, SB, and SC, thereby obtaining a read sample value series P having a waveform in which an interference between codes and an influence by a crosstalk are eliminated and supplying the read sample value series P to a discriminator 125. The discriminator 125 generates a reproduction signal obtained from the read sample value series P by discriminating the reproduction signal corresponding to the recorded information recorded on the optical disc 1.

An internal construction of the crosstalk removing circuit 10 will now be described.

Figure 3:
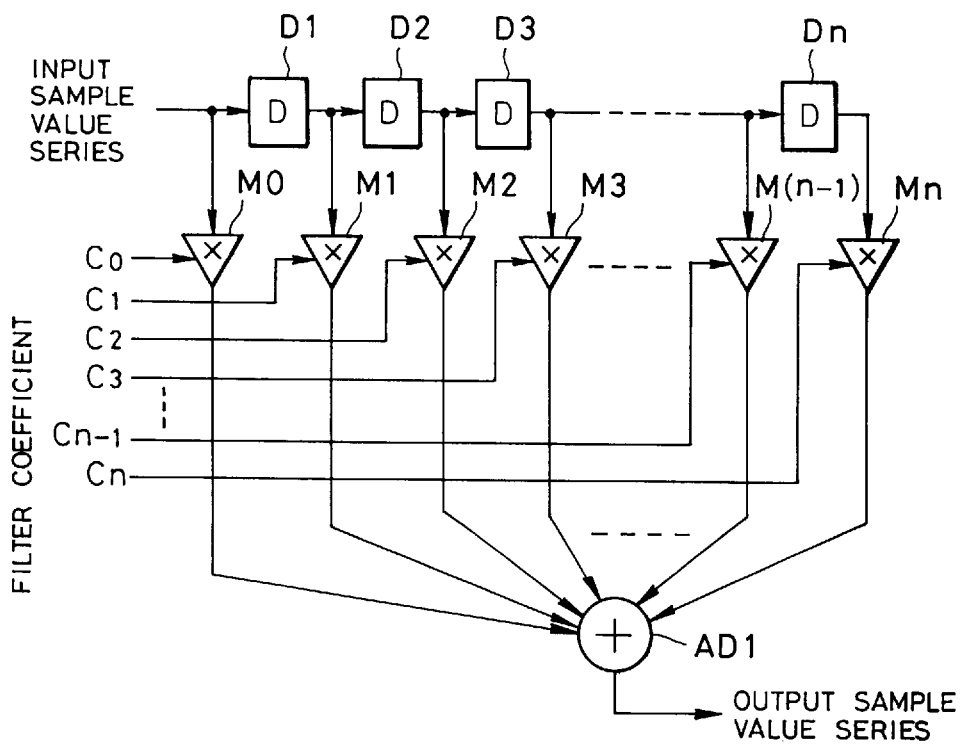
FIG. 3 is a diagram showing a construction of a transversal filter.

The crosstalk removing circuit 10 is constructed by variable coefficient filters 110, 111 and 112, a subtracter 120, a zero-cross sample value extracting circuit 130, and a filter coefficient operating circuit 123. Each of the variable coefficient filters 110, 111, and 112 is constructed by, for example, a transversal filter as shown in FIG. 3.

The transversal filter is constructed by: D flip-flops D1 to Dn of serial n stages for fetching an input sample value series while sequentially shifting them; a coefficient multiplier M0 for multiplying a filter coefficient $C_0$ to the input sample value series; coefficient multipliers M1 to Mn for respectively multiplying filter coefficients $C_1$ to $C_n$ to outputs of the D flip-flops D1 to Dn; and an adder AD1 for generating a result obtained by adding all of the values multiplied by the coefficient multipliers M0 to Mn, as an output sample value series.

The variable coefficient filter 110 with the above construction filter-processes the read sample value series SB by filter coefficients $BC_0$, to $BC_n$ supplied from the filter coefficient operating circuit 123, thereby obtaining a read sample value series R in which the interference between codes is removed and supplying the series R to the subtracter 120. The variable coefficient filter 111 filter-processes the read sample value series SA by filter coefficients $AC_0$ to $AC_n$, supplied from the filter coefficient operating circuit 123, thereby obtaining a crosstalk sample value series CR1 corresponding to the crosstalk component from the adjacent track (track T+1 in FIG. 2) and supplying the series CR1 to the subtracter 120. The variable coefficient filter 112 filter-processes the read sample value series SC by filter coefficients $CC_0$ to $CC_n$ supplied from the filter coefficient operating circuit 123, thereby obtaining a crosstalk sample value series CR2 corresponding to a crosstalk component from the adjacent track (track T−1 in FIG. 2) and supplying the series CR2 to the subtracter 120.

The subtracter 120 sets signals obtained by respectively subtracting the crosstalk value series CR1 and CR2 from the read sample value series R into the read sample value series P and supplies the series P to the discriminator 125 and zero-cross sample value extracting circuit 130.

In an period of three continuous samples in the waveform equalization read sample value series R, when the sample value is shifted from positive to negative or from negative to positive, the zero-cross sample value extracting circuit 130 extracts the center sample value, namely, zero-cross sample value among the three samples and supplies it as an error signal e to the filter coefficient operating circuit 123.

The filter coefficient operating circuit 123 obtains the filter coefficients $AC_0$ to $AC_n$ in accordance with the read sample value series SA and error signal e and supplies them to the variable coefficient filter 111 as filter coefficients $C_0$ to $C_n$ of the variable coefficient filter 111. The filter coefficient operating circuit 123 obtains the filter coefficients $BC_0$ to $BC_n$ in accordance with the read sample value series SB and error signal e and supplies them to the variable coefficient filter 110 as filter coefficients $C_0$ to $C_n$ of the variable coefficient filter 110. Further, the filter coefficient operating circuit 123 obtains the filter coefficients $CC_0$ to $CC_n$ in accordance with the read sample value series SC and error signal e and supplies them to the variable coefficient filter 112 as filter coefficients $C_0$ to $C_n$ of the variable coefficient filter 112.

The filter coefficient operating circuit 123 updates the filter coefficients $AC_0$ to $AC_n$, $BC_0$ to $BC_n$ and $CC_0$ to $CC_n$ by the LMS adaptive algorithm so that the error signal e is converged to zero.

Figure 4:
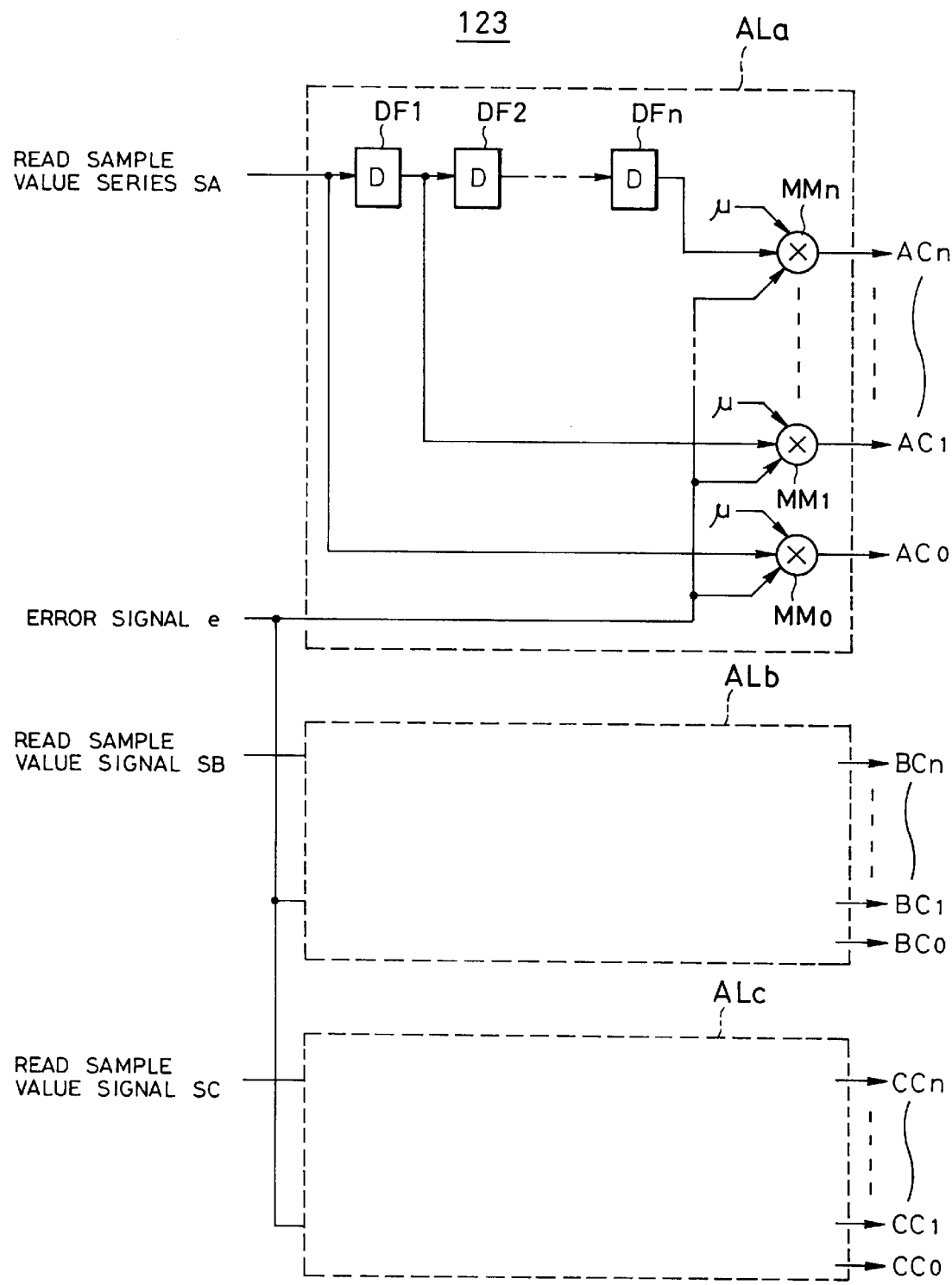
FIG. 4 is a diagram showing an internal construction of a filter coefficient operating circuit 123.

FIG. 4 is a diagram showing an internal construction of the filter coefficient operating circuit 123.

In FIG. 4, a coefficient operating circuit ALa to obtain the filter coefficients $AC_0$ to $AC_n$ in accordance with the read sample value series SA and error signal e, a coefficient operating circuit ALb to obtain the filter coefficients $BC_0$ to $BC_n$ in accordance with the read sample value series SB and error signal e, and a coefficient operating circuit ALc to obtain the filter coefficients $CC_0$ to $CC_n$ in accordance with the read sample value series SC and error signal e are the same circuit.

For example, the coefficient operating circuit ALa is constructed by D flip-flops DF1 to DFn of serial n stages for fetching the read sample value series SA while sequentially shifting them and multipliers MM0 to MMn. The multiplier MM0 generates a result, as a filter coefficient $AC_0$, obtained by respectively multiplying the error signal e and correction coefficient $\mu$ to the read sample value series SA. The multipliers MM1 to MMn generate results, as filter coefficients $AC_1$ to $AC_n$, obtained by respectively multiplying the error signal e and a correction coefficient $\mu$ to outputs of the D flip-flops DF1 to DFn.

The correction coefficient $\mu$ is a coefficient to adjust a convergence of the LMS adaptive algorithm. That is, when the correction coefficient $\mu$ is increased, a converging speed when setting the error signal e to zero can be raised. However, a possibility of divergence occurs. When the correction coefficient $\mu$ is reduced, although the convergence is guaranteed, the converging speed becomes slow.

As mentioned above, in the crosstalk removing circuit 10, by the adaptive signal process of the adaptive digital filter using, for instance, the LMS adaptive algorithm, first the read sample value series R in which the interference between codes is removed from the read signal which was read out from the track T by the center beam spot PB is obtained. Further, by the adaptive signal process, on the basis of the read signals read out from both of the tracks adjacent to the track T, the crosstalk sample value series CR1 and CR2 corresponding to the crosstalk components are obtained. By subtracting the crosstalk sample value series CR1 and CR2 corresponding to the crosstalk components from the adjacent tracks from the read sample value series R, the read sample value series P in which the influence by the crosstalks is eliminated is obtained.

In the present invention, in a period of three continuous samples in the read sample value series P, when the sample value is shifted from positive to negative or from negative to positive, the center sample value among the three samples, namely, the zero-cross sample value is extracted and is used as an error signal e, thereby updating the filter coefficient of the digital filter.

Figure 5:
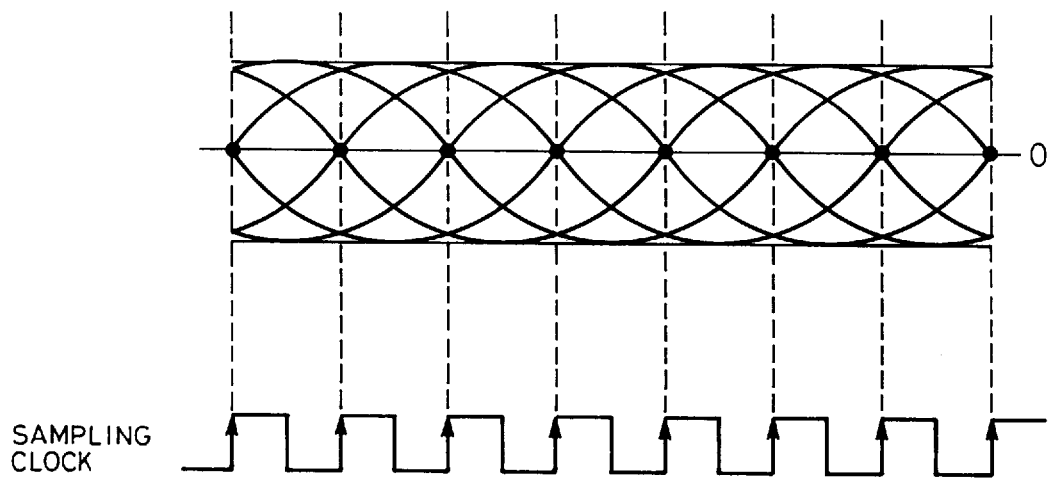
FIG. 5 is a diagram showing an example of an eye pattern of a read signal.

That is, when the read signal is waveform-equalized so as to satisfy the second reference of Nyquist and no crosstalk occurs, as shown in an eye pattern of FIG. 5, a case where the read signal intersects 0 at the sampling time point (arrow point) exists. When the crosstalk occurs, however, the waveform of the read signal is deformed and the read signal doesn't intersect 0 at the sampling time point.

In the present invention, therefore, when the sample value at the zero-cross time point is not equal to zero, it is determined that the crosstalk according to the error component occurred. The filter coefficient of the variable coefficient filter is updated so that the zero-cross sample value corresponding to the error component is converged to zero.

According to the present invention as described in detail, since the crosstalk of the read signal read from the recording medium can be removed without decreasing a recording capacity of the recording medium, the reproduction signal of a high reliability is obtained.

What is claimed is:

1. An apparatus for reproducing recorded information on a recording medium, comprising:

reading means for obtaining a first read signal by reading recorded information from a track on said recording medium and obtaining a second read signal by reading recorded information from neighboring tracks which are adjacent to the track;

an A/D converter for respectively sampling said first read signal and said second read signal and converting the respective sampled signals into a first read sample value series and a second read sample value series;

a variable coefficient filter for obtaining a crosstalk component by performing a filtering process to said second read sample value series;

a subtracter for obtaining a result obtained by subtracting said crosstalk component from said first read sample value series as a read sample value series;

zero-cross sample extracting means for extracting a zero-cross sample value from said read sample value series;

filter coefficient operating means for updating a filter coefficient of said variable coefficient filter so that said zero-cross sample value is converged to zero; and discriminating means for discriminating a reproduction signal corresponding to the recorded information in accordance with said read sample value series.

2. An apparatus according to claim 1, wherein said reading means sets the read signals read from two tracks which are neighboring on both sides of said track into said second read signal.

3. An apparatus according to claim 1, wherein said variable coefficient filter is constructed by a transversal filter.

4. An apparatus according to claim 1, wherein in a period of three continuous samples in the read sample value series, when the sample value is shifted from positive to negative or from negative to positive, said zero-cross sample extracting means sets the center sample value among said three samples into said zero-cross sample value.

5. An apparatus according to claim 1, wherein said filter coefficient operating means obtains said filter coefficient by an adaptive signal process using an LMS adaptive algorithm while setting said zero-cross sample value into an error signal and updates said filter coefficient.

* * * * *